United States Patent Office 2,772,173
Patented Nov. 27, 1956

2,772,173

SYNTHETIC WAX MATERIALS AND METHOD OF PREPARING THE SAME

Elias Fischer, Chicago, Ill., assignor to Armour and Company, Chicago, Ill., a corporation of Illinois No Drawing. Application October 24, 1952,
Serial No. 316,811

8 Claims. (Cl. 106—10)

This invention relates to new chemical compounds having wax-like characteristics and to processes for preparing the same. This invention further relates to a new class of hard, non-smearing synthetic waxes having excellent polishing characteristics.

One of the most useful waxes presently being employed in polishing preparations is carnauba wax. Carnauba, a natural wax obtained from the leaves of the carnauba palm, is desirable for its excellent film-forming and polishing characteristics. Carnauba wax produces a very hard, durable, non-smearing lustrous film, is easily emulsified, and can be incorporated in emulsions which will dry to a gloss without polishing. These emulsified preparations are known in the trade as self-polishing or no-rub wax polishes. The excellent properties of carnauba wax are to some extent offset by certain disadvantages. In particular, the wax is relatively high in price and is not always uniform in composition. It may vary in composition due to different techniques of purification and refining, or it may even be adulterated with less desirable waxes such as paraffin. Furthermore, the entire supply of carnauba wax is imported and is therefore subject to curtailment or variation beyond the control of domestic consumers.

The above considerations have naturally led to a search for synthetic wax substitutes for carnauba or to synthetic waxes which may be used to extend carnauba without detracting from its superior qualities.

Synthetic waxes heretofore suggested as replacements for carnauba wax have been lacking in one or more respects. They are either greasy and soft, smear easily and are difficult to emulsify, or they have such a high melting point as to make formulation difficult. In preparing a water emulsion of a wax the melting point of the wax should be below the boiling point of water. Otherwise the manufacturing process is unduly cumbersome.

It is, therefore, an object of this invention to provide new chemical compounds having desirable wax-like properties. It is a further object of this invention to provide methods of preparing emulsified wax materials which are non-smearing and which provide lustrous films. It is a still further object to provide useful emulsifiable wax materials which are capable of replacing, without sacrifice of desirable characteristics, more expensive waxes in the formulation of polishing compositions. It is a still further object of this invention to provide wax materials which are capable of providing hard, non-smearing films and which melt at a temperature below the boiling point of water. Other objects and advantages will be apparent hereinafter.

I have discovered new synthetic wax compounds which have excellent polishing characteristics and which may be employed in a wide variety of useful applications, as for example, in providing protective coatings for wood, metal, leather, etc. and in the preparation of wax polishes and pastes. My new waxes provide hard, lustrous films and have polishing characteristics similar to those of carnauba wax and yet have the further advantage of being relatively inexpensive. The new waxes are resistant to the action of petroleum solvents at ordinary temperatures. At elevated temperatures, that is, at the melting point temperature, and above, the new waxes are soluble in petroleum solvents. An important feature of the present invention is the fact that the new waxes melt considerably below the boiling point of water and hence are readily workable and emulsifiable.

My new compounds may be represented by the general formula

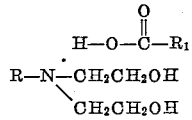

where R is an alkyl group having from 12 to 22 carbon atoms and R₁ is an alkyl or monohydroxy alkyl group having from 13 to 21 carbon atoms.

It is known that fatty acid salts of long chain alkyl amines are usually greasy, soft, wax-like compositions which smear on a surface and cannot be polished to a gloss. As an illustration of this, the stearic acid salt of stearylamine is a wax-like composition having undesirable greasy characteristics. It would ordinarily be expected that substitution of ethanol groups in the amino nucleus of the fatty acids referred to would make for increased softness. However, the present compounds (which contain two ethanol groups per molecule) are unexpectedly hard, wax-like materials and may be polished to a high gloss.

My new compounds are especially useful as extenders for carnauba wax, the combined formulation being a hard wax having excellent film-forming properties and a high gloss. Also, the new compounds may be added to other waxes such as ceresin, microcrystalline waxes, etc., to increase their hardness and to enhance their polishing qualities.

The preparation of my new wax compounds involves reacting a fatty acid and a tertiary diethanol alkyl amine to form a salt. The reaction may be conveniently represented by the following:

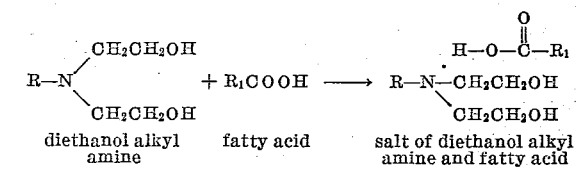

| diethanol alkyl amine | fatty acid | salt of diethanol alkyl amine and fatty acid | wherein R and R₁ have the above-mentioned significance.

According to the preferred practice, the fatty acid and amine are heated until melted and are then mixed together thoroughly. The mixing action may be provided by stirring, agitation, or other suitable means. For best results, mixing is continued until the materials are thoroughly blended or homogenized. It has been determined that at the melting temperature of the materials, the desired reaction goes forward to completion almost immediately. Therefore, after the materials have been melted and mixed, it is unnecessary to supply further heat and the reaction mixture constituting the desired product may be cooled immediately. The yield of the desired product is quantitative.

As indicated, the reaction takes place almost instantaneously upon mixing the reactants at the reaction temperature. Since the reaction is almost immediate there is no necessity for heating the materials for extended periods at melting temperatures. In fact, such heating may cause esterification which is undesirable and is therefore to be avoided. Preferably, heating of the materials is terminated immediately upon obtaining a homogeneous liquid mixture of the reacting materials.

For satisfactory results, the reaction temperature should be maintained above the melting point of the amine and fatty acid materials and yet should not be allowed to rise above 100° C. Preferably, the reaction temperature should be maintained between about 80 to 90° C., and for optimum results the temperature should be maintained at about 80° C.

As indicated, the temperature should be maintained sufficiently high to melt the materials and to facilitate mixing. In this regard, it will be unnecessary to heat the materials substantially above the minimum melting temperature. In fact, it is undesirable to supply more heat than is required for melting because of possible interference with the desired salt formation. For example, it is found that considerable esterification takes place at temperatures higher than 100° C. Esterification of the materials is to be avoided since it results in a soft, greasy product which smears on a surface and cannot be polished to a gloss. Therefore, temperatures above 100° C. are considered unsatisfactory and are to be avoided. Preferably, a minimum amount of heat should be employed consistent with obtaining thorough mixing and melting of the materials. Excellent results are obtained by melting the tertiary amine and thereafter adding the fatty acid in a solid form while maintaining the amine in liquid form until all of the fatty acid is melted and incorporated as a liquid mixture. The order of addition of materials is unimportant, and in general, any suitable manner of bringing the materials together in mixed relation will be satisfactory. The reaction may be carried out in any suitable vessel and conveniently at atmospheric pressure.

Various fatty acids are suitable for the practice of the present invention. In general, any saturated fatty acid or monohydroxy fatty acid having from 14 to 22 acyl carbon atoms will be satisfactory. Also, unsaturated fatty acids and monohydroxy acids having from 14 to 22 carbon atoms are satisfactory when employed in fatty acid materials which are largely saturated. Where extreme hardness is desired in the final product, fully saturated acids are preferred. For best results, I prefer to use acids having from 18 to 22 carbon atoms. As an illustration of the type of acids contemplated by the present invention, the following specific examples may be mentioned: myristic, palmitic, stearic, arachidic, behenic, 9-hydroxy-stearic, palmitoleic, oleic, etc. Also, mixtures of fatty acids may be employed satisfactorily, especially mixtures of fatty acids obtained from naturally occuring fats and oils, such as tallow, soybean oil, coconut oil, tall oil, marine oil, and the like. Hydrogenated fatty acid materials are likewise useful.

Amines applicable to the present invention are the tertiary diethanol alkyl amines having from 12 to 22 carbon atoms in the alkyl substituent. Usually, alkylamines having from 18 to 22 carbon atoms in the alkyl group are preferred. Diethanol stearylamine is especially useful in providing a hard wax-like product. As representative of suitable diethanol alkylamines the following specific examples may be mentioned: diethanol laurylamine, diethanol myristylamine, diethanol palmitylamine, diethanol stearylamine, diethanol arachidylamine, and diethanol behenylamine.

Where extremely hard wax materials are desired, the ratio of amine and acid employed is important. Preferably, these materials should be employed in substantially equimolar ratio and for optimum results, in exact equimolar ratio. If, for example, the acid is employed in an amount in excess of the equimolar amount, all of the acid present will not react and the free acid remaining in the final product will cause the product to be unduly soft and greasy. Similarly, a substantial excess of the amine will have an undesirable softening effect on the product.

An important feature of the present invention is the preparation of water emulsions. Emulsions prepared in accordance with the present invention have excellent polishing characteristics and an unexpectedly high viscosity. In preparing the new emulsions, substantially equimolar amounts of tertiary diethanol alkylamine and saturated fatty acid are fully reacted at a melting temperature not in excess of 100° C. (and preferably from about 80 to 90° C.) so as to form the amine salt, and the resulting salt is then emulsified in a melted form with hot water in the presence of a suitable emulsifying agent. The resulting emulsion has an unusually high viscosity, being substantially more viscous, for example, than a carnauba emulsion having an equivalent solids content. The process is particularly advantageous in that it is carried out at temperatures below the boiling point of water.

In the preparation of emulsions in accordance with the present invention, the solids content (which is substantially a measure of the proportion of amine salt employed) may be varied widely and will be determined by the specific use for which the emulsion is intended. The preferred range of solids is about 7 to 15% by weight. Higher and lower percentages may be employed depending on the ultimate physical characteristics desired.

In the preparation of emulsions which will polish to a high gloss and which will not smear it is an important requirement to employ the amine and acid in substantially equimolar ratio. Also, it is desirable to employ acid materials which are substantially fully saturated. Saturated materials provide emulsions which dry to hard, non-smearing films, and are generally more satisfactory than unsaturated materials. However, the latter may be employed with satisfactory results, especially in mixtures containing a major portion of saturated materials.

To facilitate the formation of the present emulsions and to render them stable, an emulsifying agent is employed. Any suitable emulsifying agent will be satisfactory for this purpose. As illustrative of preferred emulsifying agents, the following may be mentioned: triethanolamine oleate, morpholine oleate, N-substituted polyoxyethylene fatty acid amides, and water soluble acetate salts of higher fatty amines.

In providing the present emulsions, any suitable means of bringing the present amine salts and water in emulsified relation will be satisfactory. Preferably, the amine salt material is heated to a melting temperature below the boiling point of water to cause the amine salt material to melt, and the resulting liquid material is then agitated with hot water and an effective amount of an emulsifying agent so as to provide a stable emulsion. A preferred amount of emulsifier is approximately 5% of the total weight of the ingredients. Larger or smaller proportions may be employed, as for example, 1% by weight emulsifier will be suitable in some cases. Generally, it is desirable to employ only the minimum amount of emulsifier needed to provide a stable emulsion.

A further feature of the invention is the preparation of solvent paste polishes incorporating the new wax compounds. Solvent paste polishes prepared in accordance with the present invention buff to a high gloss, are non-smearing or streaking, and are especially well adapted for use as auto and floor polishes, in metal finishing, leather dressing, in adding protective films on metal products, etc. In preparing solvent paste polishes, the new amine salts are heated and mixed with a wax having good solvent retention properties such as ceresin. A wax solvent such as mineral spirits, naphtha, turpentine or the like is then added slowly with stirring to the melted wax mixture and the solution is slowly cooled to form the paste polish product.

In preparing the solvent paste polishes, the amine salt-wax mixture is preferably heated to a temperature just above the melting point of the wax. The proportions of solvent and wax may be varied widely depending on the specific use for which the paste is intended. The use of 1 part of a mixture of waxes to 4 parts of wax solvent has been found satisfactory for a paste having excellent spreading qualities and which will produce a high polish on porous surfaces.

The following preferred embodiments will serve to illustrate the present invention:

EXAMPLE I

*Salts of diethanol stearylamine and mixed fatty acids*

370 grams of diethanol stearylamine are melted and 280 grams of a mixture of fatty acids (approximate parts by weight, palmitic 6; stearic 90; oleic 4) are added slowly, with stirring, while maintaining the temperature of the mixture at 80° C., until the fatty acids are formed into a homogeneous mixture with the amine. This mixture which constitutes the product, solidifies upon cooling at 62 to 65° C.

EXAMPLE II

*Salt of diethanol stearylamine and behenic acid*

370 grams of diethanol stearylamine and 341 grams of behenic acid (obtained by saturating $C_{22}$ fatty acids contained in menhaden oil) are melted together slowly with stirring, at a temperature of 80° C. The temperature is maintained at 80° C. until the amine is thoroughly mixed with the behenic acid. The mixture which constitutes the product, is then cooled and solidified.

EXAMPLE III

*Salt of diethanol stearylamine and 9(10)-hydroxy stearic acid*

370 grams of diethanol stearylamine are mixed with 300 grams of 9(10)-hydroxy stearic acid and heated at 80° C. to provide a molten homogeneous mixture. The mixture containing the product in theoretical yield is then cooled to the solidification point.

EXAMPLE IV

*Salt of diethanol laurylamine and stearic acid*

300 parts by weight of diethanol laurylamine and 280 parts by weight of stearic acid are melted together with stirring at a temperature of 70° C. The temperature is maintained at 70° C. until the materials are thoroughly mixed whereupon the mixture is allowed to cool to room temperature. The cooled mixture which is the desired product is a light colored wax-like material.

EXAMPLE V

*Salt of diethanol stearylamine and myristic acid*

370 parts by weight of diethanol stearylamine are melted, and 226 parts by weight of myristic acid are added slowly with stirring at a temperature of 80° C. The temperature is held at 80° C. until all of the myristic acid is incorporated and the amine and acid are thoroughly mixed. The mixed material is a relatively pure form of the myristic acid salt of diethanol stearylamine.

EXAMPLE VI

*Preparation of wax emulsion*

4 parts by weight of triethanolamine oleate are dissolved in 12 parts by weight of the melted product of Example I and combined with 84 parts boiling water and agitated vigorously until a homogeneous emulsion is obtained. The emulsion is then cooled to room temperature with occasional gentle stirring.

Emulsions may be prepared by the above preferred method with any of the products of Examples II to V, employing the proportions of ingredients as indicated. If desired, the emulsions prepared by the above methods may be further diluted with water.

EXAMPLE VII

*Preparation of paste polish*

To 8 parts by weight of the product of Example I are added 6 parts by weight of ceresin wax and 1 part by weight of paraffin 140° F. The waxes are heated to a temperature just above the melting point of the wax and mixed. 16 parts by weight of turpentine are added slowly with stirring and the product slowly cooled.

EXAMPLE VIII

*Preparation of paste polish*

12 parts by weight of the product of Example I are melted and mixed with 10 parts by weight of paraffin 140° F. and 8 parts by weight of ceresin wax. To the melted wax mixture is slowly added with stirring 60 parts by weight of naphtha and 10 parts by weight of turpentine. The product is cooled slowly to form a paste polish having excellent polishing and spreading qualities.

While in the foregoing specification I have set forth specific details and embodiments of the present invention, it will be understood that considerable variation may be made in such details and embodiments without departing from the spirit of my invention.

I claim:

1. A composition capable of providing hard, non-smearing films, consisting essentially of an emulsion of water, an emulsifying agent and salts of a tertiary diethanol amine having an alkyl group containing from 12 to 22 carbon atoms and fatty acid material of which a major portion represents saturated fatty acid selected from the group consisting of fatty acids and monohydroxy fatty acids and having from 14 to 22 carbon atoms.

2. A composition capable of providing hard, non-smearing films, consisting essentially of an emulsion of water, an emulsifying agent and a salt of a tertiary diethanol amine having an alkyl group containing from 12 to 22 carbon atoms and a saturated monohydroxy fatty acid having from 14 to 22 carbon atoms.

3. A composition capable of providing hard, non-smearing films, consisting essentially of an emulsion of water, an emulsifying agent and the stearic acid salt of diethanol stearylamine.

4. A composition capable of providing high gloss films, consisting essentially of an emulsion of water, an emulsifying agent and a salt of a tertiary diethanol amine having an alkyl group containing from 12 to 22 carbon atoms and a saturated fatty acid selected from the group consisting of fatty acids and monohydroxy fatty acids having from 14 to 22 carbon atoms.

5. A composition capable of providing hard, non-smearing films, consisting essentially of an emulsion of water, an emulsifying agent and a salt of a tertiary diethanol amine having an alkyl group containing from 12 to 22 carbon atoms and a saturated fatty acid having from 14 to 22 carbon atoms.

6. A composition comprising a mixture of a salt of a tertiary diethanol amine having an alkyl group containing from 12 to 22 carbon atoms and a saturated fatty acid selected from the group consisting of fatty acids and monohydroxy fatty acids having from 14 to 22 carbon atoms and a wax solvent.

7. A composition comprising the stearic acid salt of diethanol stearylamine and naphtha.

8. A composition comprising the stearic acid salt of diethanol stearylamine and turpentine.

References Cited in the file of this patent

UNITED STATES PATENTS

| | | |
|---|---|---|
| 1,990,365 | Beale | Feb. 5, 1935 |
| 2,154,423 | De Groote et al. | Apr. 18, 1939 |
| 2,234,934 | Steinle et al. | Mar. 11, 1941 |
| 2,359,043 | Link et al. | Sept. 26, 1944 |
| 2,394,833 | Young et al. | Feb. 12, 1946 |
| 2,597,871 | Iler | May 27, 1952 |